United States Patent [19]

Prather

[11] 4,352,696
[45] Oct. 5, 1982

[54] PROCESS AND COMPOSITION
[75] Inventor: Richard A. Prather, Houston, Tex.
[73] Assignee: The Upjohn Company, Kalamazoo, Mich.
[21] Appl. No.: 248,804
[22] Filed: Mar. 30, 1981
[51] Int. Cl.³ .............................................. C08L 1/00
[52] U.S. Cl. ................................... 106/163 R; 524/35
[58] Field of Search .................. 162/159, 164 R, 164; 106/163; 260/9; 528/51; 521/107; 524/35

[56] References Cited
U.S. PATENT DOCUMENTS

| | | | |
|---|---|---|---|
| 3,151,016 | 9/1964 | Kutik et al. ......................... | 162/136 |
| 3,428,592 | 2/1969 | Youker .............................. | 260/29.2 |
| 3,440,189 | 4/1969 | Sharp ................................ | 260/9 |
| 3,498,936 | 3/1970 | Wilson .............................. | 521/107 |
| 3,557,263 | 1/1971 | Marra ................................ | 264/45 |
| 3,636,199 | 1/1972 | Jenks et al. ........................ | 264/134 |
| 3,870,665 | 3/1975 | Diehr et al. ....................... | 260/17.2 |
| 3,919,017 | 11/1975 | Shoemaker et al. ............... | 156/62.2 |
| 3,930,110 | 12/1975 | Shoemaker et al. ............... | 428/424 |
| 4,024,088 | 5/1977 | Godlewski ......................... | 528/51 |
| 4,257,995 | 3/1981 | McLaughlin et al. ............. | 264/122 |
| 4,257,996 | 3/1981 | Farrissey et al. .................. | 264/122 |
| 4,258,169 | 3/1981 | Prather et al. .................... | 260/9 |

Primary Examiner—Theodore Morris
Attorney, Agent, or Firm—Denis A. Firth; John Kekich

[57] ABSTRACT

The use of polyisocyanates as binders in the preparation of particle boards is subject to the drawback that the boards exhibit a tendency to adhere to the face of the platens used in their formation. This problem is minimized by incorporating minor amounts of certain phosphinic and or phosphonic acids or derivatives thereof or phosphites into the polyisocyanate to be used as binder. The polyisocyanates and the phosphorus compounds are applied to the particles separately, or after preblending one with the other. Whether the components are applied separately or in combination one with the other, they can each be applied either neat or in the form of an emulsion or emulsions.

17 Claims, No Drawings

PROCESS AND COMPOSITION

BACKGROUND OF THE INVENTION

1. Field of the Invention

This invention relates to particle board binders and is more particularly concerned with the use of organic polyisocyanates as particle board binders, with compositions for said use, and with the particle boards so prepared.

2. Description of the Prior Art

The use is now widely recognized of organic polyisocyanates, particularly toluene diisocyanate, methylenebis(phenyl isocyanate), and polymethylene polyphenyl polyisocyanates, as binders, or as a component or a binder, for the preparation of particle boards; see, for example, U.S. Pat. Nos. 3,428,592; 3,440,189; 3,557,263; 3,636,199; 3,870,665; 3,919,017 and 3,930,110.

In a typical process the binder resins, optionally in the form of a solution or aqueous suspension or emulsion, are applied to or admixed with the particles of cellulosic material, or other types of material capable of forming particle boards, using a tumbler apparatus or blender or other form of agitator. The mixture of particles and binder is then formed into a mat and subjected to heat and pressure using heated platens. The process can be carried out in a batch operation or continuously. To avoid adhesion of the board so formed to the heated platens it has hitherto been necessary to interpose a sheet, impermeable to isocyanate, between the surface of the board and the platen during the forming process, or to coat the surface of the platen, prior to each molding operation, with an appropriate release agent or to coat the surface of the particles themselves with a material which will not adhere to the platen. Any of these alternatives, particularly where the process is being operated on a continuous basis, is cumbersome and a drawback to what is otherwise a very satisfactory method of making a particle board with highly attractive structural strength properties.

I have now found that the above drawbacks to the use of organic isocyanates as particle board binders can be minimized in a very satisfactory manner by incorporating certain phosphinic and or phosphonic acids or derivatives thereof or phosphites as internal release agents in the isocyanate compositions so utilized.

Copending application Ser. No. 134,315 filed Mar. 26, 1980 now U.S. Pat. No. 4,256,995 describes the incorporation of acid phosphates and pyrophosphates as internal release agents in particle board binder compositions based on organic polyisocyanates. Copending application Ser. No. 139,872 filed Apr. 14, 1980 now U.S. Pat. No. 4,257,996 describes the use of related phosphorus compounds for the same purpose.

SUMMARY OF THE INVENTION

This invention comprises an improved process for the preparation of particle board in which particles of organic material capable of being compacted are contacted with a polyisocyanate and the treated particles are subsequently formed into boards by the application of heat and pressure, wherein the improvement comprises contacting said particles, in addition to the treatment with polyisocyanate, with from about 0.1 to 20 parts, per 100 parts by weight of polyisocyanate, of a compound selected from the class consisting of (a) compounds having the formulae:

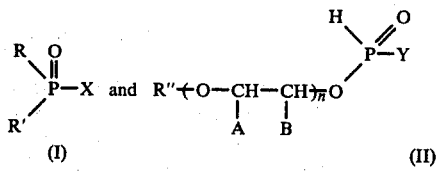

wherein R is hydrocarbyl; R' is selected from the group consisting of hydrocarbyl, alkoxy, hydroxyl and

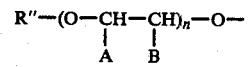

wherein R" is selected from the group consisting of alkyl and aryl, one of A and B represents hydrogen and the other is selected from the class consisting of hydrogen, methyl, chloromethyl and 2,2,2-trichloroethyl, and n is a number having an average value from 1 to 25;

R and R' taken together represent alkylene having 3 to 5 carbon atoms in the chain separating the valencies;

X is selected from the group consisting of hydroxy, halo, acyloxy, hydrocarbylamino, and

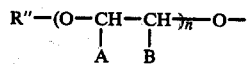

wherein R", A, B, and n are as defined above; and

Y represents a member selected from the group consisting of halo and

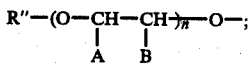

(b) metal, ammonium and organic amine salts of the acids of formula (I) wherein R' and or X represents hydroxyl.

The invention also comprises novel compositions comprising organic polyisocyanates having incorporated therein one or more of the aforesaid compounds. The invention also comprises particle board prepared in accordance with the aforesaid process.

The term "hydrocarbyl" means the monovalent radical obtained by removing one hydrogen atom attached to a carbon atom of the parent hydrocarbon. Illustrative of hydrocarbyl are alkyl such as methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, pentacosyl, hexacosyl, heptacosyl, octacosyl, nonacosyl, triacontyl, pentatriacontyl, and the like, including isomeric forms thereof; alkenyl such as allyl, butenyl, pentenyl, hexenyl, octenyl, decenyl, undecenyl, tridecenyl, hexadecenyl, octadecenyl, nonadecenyl, eicosenyl, docosenyl, tricosenyl, hexacosenyl, octacosenyl, nonacosenyl, triacontenyl, pentatriacontenyl and the like, including isomeric forms; aryl such as phenyl, naphthyl, biphenylyl, triphenylyl, tolyl, xylyl, butylphenyl, octylphenyl, nonylphenyl, decylphenyl, decyltolyl, octadecylphenyl and the like; aralkyl such as benzyl, phenethyl, phenylpropyl, benzhydryl, naphthylmethyl and the like; cycloalkyl such as cyclobutyl, cyclopentyl, cyclohexyl, cycloheptyl, cyclooctyl and the like; and cycloalkenyl such as cyclopentenyl, cyclohexenyl, cycloheptenyl, cyclooctenyl, and the like.

The term "alkoxy" means the group -O-alkyl wherein alkyl is as defined above.

The hydrocarbyl groups present in the compounds of formula (I) can be substituted by one or more inert substituents, i.e. substituents which do not react with an isocyanate group or otherwise interfere with the use of the compound (I) in the process of the invention. Illustrative of inert substituents are alkyl from 1 to 6 carbon atoms, alkoxy from 1 to 6 carbon atoms, alkylmercapto from 1 to 6 carbon atoms, alkenyl from 1 to 6 carbon atoms, cyano and halo (i.e. chloro, bromo, fluoro, iodo).

The term "alkylene having 3 to 5 carbon atoms in the chain separating the valencies" means 1,3-propylene, 1,4-butylene and 1,5-pentylene each of which can be substituted by one or more alkyl groups (as defined above) provided that the total number of carbon atoms in the alkylene group does not exceed 6. The compounds of formula (I) in which R and R' together represent 1,3-propylene are 1-hydroxyphosphetane-1-oxides, those in which R and R' together represent, 1,4-butylene are 1-hydroxyphospholane-1-oxides and those in which R and R' together represent 1,5-pentylene are 1-hyroxy-phosphorane-1-oxides.

The term "metal salt" is inclusive of salts with alkali metals such as lithium, sodium, potassium and rubidium; alkaline earth metals such as calcium, strontium, magnesium and barium, and heavy metals such as vanadium, chromium, manganese, iron, cobalt, nickel, copper, zinc and the like. The term "amine salts" means the salts of the phosphonates and phosphinates in question with organic amines which latter are exemplified by monoalkylamines such as methylamine, ethylamine, isopropylamine, sec-butylamine, amylamine, hexylamine, isohexylamine, octylamine and the like; dialkylamines such as dimethylamine, N-ethyl-N-methylamine, N-methyl-N-propylamine, N-methyl-N-isobutylamine, diisopropylamine, N-ethyl-N-hexylamine, N-methyl-N-isooctylamine and the like; trialkylamines such as triethylamine, trimethylamine, N,N-dimethylpropylamine, N,N-dimethylhexylamine, N,N-diethylisobutylamine and the like; monoalkenylamines such as allylamine, 2-butenylamine, 3-hexenylamine, octenylamine and the like; dialkenylamines such as diallylamine, di-2-butenylamine, di-3-hexenylamine, and the like; cycloalkylamines such as cyclopropylamine, cyclobutylamine, cyclopentylamine, cyclohexylamine and the like; N-alkyl-cycloalkylamines such as N-methylcyclopentylamine, N-ethylcyclopentylamine, N-propylcyclohexylamine and the like; cycloalkenylamines such as cyclopentenylamine, cyclohexenylamine and the like; aralkylamines such as benzylamine, phenethylamine, phenylpropylamine, benzhydrylamine and the like; N-alkyl-N-aralkylamines such as N-methylbenzylamine, N-propylbenzylamine, N-isobutylbenzylamine, N-octylbenzylamine, N-methylphenethylamine and the like; N,N-disubstituted aralkylamines such as N,N-dimethylbenzylamine, N-methylbenzhydrylamine, N,N-diethyl-3-phenylpropylamine, N-butyl-2-phenethylamine and the like; N-alkyl-arylamines such as N-methylaniline, N-isopropyl aniline, N-hexylaniline, N-methyl-p-toluidine, N-ethyl-m-xylidine, N-methylnapthylamine, N-methylbenzidine, N,N'-dimethylbenzidine and the like; N,N-dialkylarylamines such as N,N-dimethylaniline, N,N-dibutylaniline, N-hexyl-N-methylaniline, N,N-dimethyltoluidine and the like; N-aralkylarylamines such as N-benzylaniline, N-phenethylaniline, N-benzhydrylaniline and the like; arylamines such as aniline, o-, m-, and p-toluidine, o-, m-, and p-xylidine, 1-naphthylamine, 2-naphthylamine and the like; alkanolamines such as ethanolamine, propanolamine, diethanolamine and the like; heterocyclic amines such as pyridine, quinoline, pyrrolidine, piperazine, morpholine, and alkyl-substituted pyrrolidines, piperidines, piperazines and morpholines, such as N-methyl-pyrrolidine, N-ethylpiperidine, N-methyl-N'-hexylpiperazine, N-methyl-morpholine and the like.

DETAILED DESCRIPTION OF THE INVENTION

The process of the invention is carried out substantially in accordance with methods previously described in the art in which an organic polyisocyanate is used as the binder resin, or a component thereof, (see, for example, German Offenlegungsschrift No. 2610552 and U.S. Pat. No. 3,428,592) with the chief exception that a compound (I) or (II) or a salt thereof as hereinbefore defined is employed in combination with the isocyanate composition which is used to treat the particles which are to be bonded together to form the particle board.

Thus, particle board is produced according to the invention by bonding together particles of wood or other cellulosic or organic or inorganic materials capable of being compacted using heat and pressure in the presence of a binder system which comprises a combination of an organic polyisocyanate and at least one compound (I) or (II) or a salt of compound (I), hereinafter referred to collectively as the "release agent". The polyisocyanate and the release agent can be brought into contact with the particles as separate, individual components or, in a preferred embodiment, the polyisocyanate and release agent are brought into contact with the particles either simultaneously or after admixture. Whether the polyisocyanate and release agent are introduced separately or in admixture, they can be employed neat, i.e. without diluents or solvents or one or other or both can be employed in the form of aqueous dispersions or emulsions.

The polyisocyanate component of the binder system can be any organic polyisocyanate which contains at least two isocyanate groups per molecule. Illustrative of organic polyisocyanates are diphenylmethane diisocyanate, m- and p-phenylene diisocyanates, chlorophenylene diisocyanate, $\alpha,\alpha'$-xylylene diisocyanate, 2,4- and 2,6-toluene diisocyanate and the mixtures of these two isomers which are available commercially, triphenylmethane triisocyanates, 4,4'-diisocyanatodiphenyl ether, and polymethylene polyphenyl polyisocyanates. The latter polyisocyanates are mixtures containing from about 25 to about 90 percent by weight of methylenebis(phenyl isocyanate) the remainder of the mixture being polymethylene polyphenyl polyisocyanates of functionality higher than 2.0. Such polyisocyanates and methods for their preparation are well-known in the art; see, for example, U.S. Pat. Nos. 2,683,730; 2,950,263; 3,012,008 and 3,097,191. These polyisocyanates are also available in various modified forms. One such form comprises a polymethylene polyphenyl polyisocyanate as above which has been subjected to heat treatment, generally at temperatures from about 150° C. to about 300° C., until the viscosity (at 25° C.) has been increased to a value within the range of about 800 to 1500 centipoises. Another modified polymethylene polyphenyl polyisocyanate is one which has been treated with minor amounts of an epoxide to reduce the acidity thereof in accordance with U.S. Pat. No. 3,793,362.

The polymethylene polyphenyl polyisocyanates are the preferred polyisocyanates for use in the binder systems of the invention. Particularly preferred polymethylene polyphenyl polyisocyanates are those which contain from about 35 to about 65 percent by weight of methylenebis(phenyl isocyanate).

When the organic polyisocyanate is to be employed as binder system in the form of an aqueous emulsion or dispersion in accordance with the invention, the aqueous emulsion or dispersion can be prepared using any of the techniques known in the art for the preparation of aqueous emulsions or dispersions, prior to use of the composition as the binder. Illustratively, the polyisocyanate is dispersed in water in the presence of an emulsifying agent. The latter can be any of the emulsifying agents known in the art including anionic and nonionic agents. Illustrative of nonionic emulsifying agents are polyoxyethylene and polyoxypropylene alcohols and block copolymers of two or more of ethylene oxide, propylene oxide, butylene oxide, and styrene, alkoxylated alkylphenols such as nonylphenoxy poly(ethyleneoxy)ethanols; alkoxylated aliphatic alcohols such as ethoxylated and propoxylated aliphatic alcohols containing from about 4 to 18 carbon atoms; glycerides of saturated and unsaturated fatty acids such as stearic, oleic, and ricinoleic acids and the like; polyoxyalkylene esters of fatty acids such as stearic, lauric, oleic and like acids; fatty acids amides such as the dialkanolamides of fatty acids such as stearic, lauric, oleic and like acids. A detailed account of such materials is found in Encyclopedia of Chemical Technology, Second Edition, Vol. 19, pp. 531–554, 1969, Interscience Publishers, New York.

The formation of the emulsion or dispersion can be carried out at any time prior to its use as the binder composition, but, preferably, it is carried out within about 3 hours prior to use. Any of the methods conventional in the art for the preparation of aqueous emulsions can be employed in preparing the aqueous polyisocyanate emulsions employed in the process of the invention. Illustratively, the emulsion is formed by bringing the polyisocyanate, emulsifying agent and water together under pressure using a conventional spray gun in which the streams of water and polyisocyanate impinge and are mixed under turbulent conditions in the mixing chamber of the spray gun. The emulsion so formed is discharged in the form of a spray which is applied to the cellulosic particles to be formed into boardstock in the manner discussed below.

As discussed above, the release agent can be brought into contact with the particles as a separate component in which case it is employed in neat form, i.e. without diluents, or as an aqueous solution or dispersion. Preferably, the release agent, either neat or in diluted form, when used alone i.e. separately from the polyisocyanate, is presented to the particles in the form of a spray. However, in a preferred embodiment of the invention the release agent and the polyisocyanate are employed together in a single composition. This can be accomplished in several ways. Thus, when the polyisocyanate is employed as binder resin without diluents such as water, the release agent can be incorporated into the polyisocyanate by simple admixture. Where the polyisocyanate is employed as binder resin in the form of an aqueous emulsion the release agent can be added as a separate component during the formation of the emulsion or after its formation or, in a particularly advantageous embodiment, the release agent is premixed with the organic polyisocyanate prior to emulsification of the latter. Thus, the organic polyisocyanate and the release agent can be premixed and stored for any desired period prior to formation of the emulsion. Further, when an emulsifying agent is employed in preparation of the emulsion said agent can also be incorporated into the mixture of organic polyisocyanate and release agent to form a storage stable composition which can be converted, at any desired time, to an aqueous emulsion for use as a binder resin by simple admixture with water.

When the polyisocyanate is employed as binder in the form of an aqueous emulsion, the proportion of organic polyisocyanate present in the said aqueous emulsion is advantageously within the range of about 0.1 to about 99 percent by weight and preferably within the range of about 25 to about 75 percent by weight.

Whether the release agent is introduced as a separate component or in combination with the polyisocyanate, the proportion of release agent employed is within the range of about 0.1 to about 20 parts by weight, per 100 parts of polyisocyanate and, preferably, is within the range of about 1 to about 10 parts by weight, per 100 parts of polyisocyanate. The proportion of emulsifying agent required to prepare the aqueous emulsion is not critical and varies according to the particular emulsifying agent employed but is generally within the range of about 0.1 to about 20 percent by weight based on polyisocyanate.

The starting material for the particle board comprises particles of cellulosic and like material capable of being compacted and bonded into the form of boards. Typical such materials are wood particles derived from lumber manufacturing waste such as planar shavings, veneer chips, and the like. Particles of other cellulosic material such as shredded paper, pulp or vegetable fibres such as corn stalks, straw, bagasse and the like, and of non-cellulosic materials such as scrap polyurethane, polyisocyanurate and like polymer foams can also be used. Inorganic materials such as hydrated alumina, gypsum, chopped mineral fibres and the like can also be employed, either alone or in combination with any of the above cellulosic or non-cellulosic materials, in the formation of particle boards in accordance with the present invention. If desired, mixtures of cellulosic particles may be used. Particle board has been successfully produced, for example, from wood particle mixtures containing up to about 30% bark.

The moisture content of the particles suitably may range from about 0 to about 24 percent by weight. Typically, particles made from lumber waste materials contain about 10–20% moisture, and may be used without first being dried.

Particle board is fabricated by spraying the particles with the components of the binder composition, either separately or in combination, while the particles are tumbled or agitated in a blender or like mixing apparatus. Illustratively, a total of about 2 to 8% by weight of the binder system (excluding any water present therein) is added, based on the "bone dry" weight of the particles, but higher or lower amounts of binder resin may be used in any given application. Illustratively, where the particles are of large size, such as in chipboard and wafer board, it is possible to use amounts of binder as low as 1% by weight or even less based on the "bone dry" weight of the particles. Where the particles are very small, i.e. have a high surface area to volume ratio as in the case of powdered inorganic materials, it is desirable to use amounts of binder as high as about 20 percent by weight or even higher. If desired, other materials, such as wax sizing agents, fire retardants, pigments and the like, may also be added to the particles during the blending step.

After blending sufficiently to produce a uniform mixture, the coated particles are formed into a loose mat or felt, preferably containing between about 4% and about 18% moisture by weight. The mat is then placed in a heated press between caul plates and compressed to consolidate the particles into a board. Pressing times, temperatures and pressures vary widely depending on the thickness of the board produced, the desired density of the board, the size of the particles used, and other factors well known in the art. By way of example, however, for ½" thick particle board of medium density, pressures of about 300 to 700 psi and temperatures of about 325°–375° F. are typical. Pressing times are typically about 2–5 minutes. Because a portion of the moisture present in the mat reacts with polyisocyanate to form polyurea, as described earlier, the level of moisture present in the mat is not as critical with isocyanate binders as with other binder systems.

The above-described process can be carried out on a batch basis, i.e. individual sheets of particle board can be molded by treating an appropriate amount of particles with the binder resin combination and heating and pressing the treated material. Alternatively, the process can be carried out in a continuous manner by feeding treated particles in the form of a continuous web or mat through a heating and pressing zone defined by upper and lower continuous steel belts to which, and through which, the necessary heat and pressure are applied.

Whether the process of the invention is carried out in a batchwise or continuous manner, it is found that the particle board produced using the polyisocyanate and release agent combination of the invention is released readily from the metal plates of the press used in its formation and shows no tendency to stick or adhere to said plates. This is in direct contrast to previous experience with the use of polyisocyanates alone as binder resins as discussed above.

The compounds of the formulae (I) and (II) are, for the most part, known in the art and can be prepared by methods well-known in the art. Methods for their preparation are described by Van Wazer, Phosphorus and Its Compounds, Vol. 1, Interscience Publishers Inc., New York, 1958 at pages 370 and 384–5 for the phosphinic (I:R'=hydrocarbyl) and phosphonic (I:R'=OH or alkoxy) acid derivatives, respectively and methods for the preparation of the phosphites (II) are shown at page 371 et seq. of the same publication.

Illustrative of known compounds of formula (I) are:- bromochloropropyl-, 1-bromo-2-cyanoethenyl-, 2-bromocyclohexyl-, 2-bromo-2,2-dicyano-1-phenylethyl-, 2-bromoethyl-, 4-bromophenyl-, 4-bromobenzyl-, 1-bentenyl-, 1-butoxyethyl-, 4-butylphenyl-, 4-chlorobutyl-, 2-chlorododecyl-, 4-chlorophenyl-, 4-cyanobutyl-, 4-cyanophenyl-, 1-cyclohepten-1-yl-, 1-cyclohexen-1-yl-, cyclohexyl-, cyclohexylmethyl-, decyl-, 2,4-dimethoxyphenyl-, isobutyl-, 2,4-xylyl-, benzhydryl-, docosyl-, dodecyl-, 2-ethylhexyl-, 4-ethylphenyl-, 3-fluorophenyl-, 1-heptenyl-, heptyl-, hexadecyl-, 3-hexenyl-, 4-methoxyphenyl-, 4-methoxybenzyl-, p-tolyl-, 1-naphthyl-, 2-naphthyl-, nonyl-, 9-octadecenyl-, octadecyl-, 2-pentenyl-, phenyl-, 4-phenylbutyl-, phenethyl-, benzyl-, tetradecyl- and (trichloromethyl)-phenylphosphonic acids; bis(2-bromoethyl)-, bis(bromobenzyl)-, bis(4-chlorophenyl)-, bis(2-cyanoethyl)-, bis(cyclohexylmethyl)-, bis(2-ethylhexyl)-, bis(heneicosafluorodecyl)-, bis(2-methoxyphenyl)-, bis(p-tolyl)-, bis(benzyl)-, bis(trichloromethyl)-, 2-butenylethyl-, (butyl, benzyl)-, (butyl, trichloromethyl)-, (2-chlorocyclohexyl)-, (2-chlorocyclopentyl)-, (4-chlorophenyl)-, 1-cyclohexen-1-ylethyl-, cyclohexyl-, 1-decenyl-, dibutyl-, didodecyl-, dieicosyl-, diethyl-, dihexadecyl-, (2,4-dimethoxyphenyl)-, 2,5-xylyl-, dioctadecyl-, diphenyl-, 1-dodecenyl-, (4-methoxyphenyl)-, tolyl-, 2-naphthyl-, octylphenyl-, phenyl-, benzyl-, phenylpropyl-, tetracosyl-, and 1-undecenyl-phosphinic acids; 1-hydroxy-3-methyl-3-phospholene-1-oxide and 1-hydroxy-2,2,3,3,4,4-hexamethylphosphetane 1-oxide; and the methyl, ethyl, hexyl and octyl esters of phenyl-, cyclohexyl-, dodecyl- and benzylphosphonic acids.

In a further embodiment of the invention it is found that the combination of polyisocyanate and release agent employed as binder in the process of the invention can be used in conjunction with thermosetting resin binders hitherto employed in the art such as phenol-formaldehyde, resorcinol-formaldehyde, melamine-formaldehyde, urea-formaldehyde, urea-furfural and condensed furfuryl alcohol series. Not only does the use of such a combination avoid the problems of adhesion of the finished particle boards to the platens of the press, which problems were previously encountered with a blend of isocyanate and the above type of thermosetting resin binder, but the physical properties of the particle boards so obtained are markedly improved by the use of the combination.

The following preparations and examples describe the manner and process of making and using the invention and set forth the best mode contemplated by the inventors of carrying out the invention but are not to be construed as limiting.

PREPARATION 1

Dibutyl heptylphosphonate

A batch of 50.1 g. (0.2 mole) of tributylphosphite was stirred at room temperature (circa 20° C.) in a flask fitted with reflux condenser and a total of 45.2 g. (0.2 mole) of heptyl iodide was added slowly. The mixture so obtained was heated to initiate an exothermic reaction and the reaction temperature was maintained at circa 170° C. for 1.5 hr. until the reaction was adjudged complete based on nuclear magnetic resonance spectral examination of an aliquot. The product so obtained was cooled to room temperature and the liberated butyl iodide was removed by distillation under reduced pressure to yield 54 g. of dibutyl heptylphosphonate.

Using the above procedure but replacing heptyl iodide by dodecyl iodide there was obtained dibutyl dodecylphosphonate.

PREPARATION 2

Heptylphosphonic acid

A batch of 53 g. of dibutyl heptylphosphonate was heated to 170° C. under an atmosphere of nitrogen with stirring and anhydrous hydrogen chloride was bubbled into the mixture at a slow rate for a period of 1.6 hr. The hydrolysis was adjudged complete at that time based on nuclear magnetic resonance spectral analysis of an aliquot. The resulting product was subjected to distillation under reduced pressure to remove residual butyl chloride and hydrogen chloride. There was thus obtained, as the residue, heptylphosphonic acid. Using the above procedure but replacing the dibutyl heptylphosphonate by diethyl ethylphosphonate and dioctyl octylphosphonate there was obtained O-ethyl ethylphosphonate and O-octyl octylphosphonate, respectively. Similarly, using the above procedure, but substituting dibutyl dodecylphosphonate for dibutyl butylphosphonate there was obtained dodecylphosphonic acid.

PREPARATION 3

O-(butoxyethoxyethyl) chlorophosphite

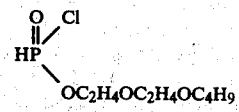

[this compound can also be named as O-(butoxyethoxyethyl) hydrogen chlorophosphonate]

A mixture of 13.96 g. of phosphorus trichloride and 50 ml. of petroleum ether (b.p. 30°–75° C.) was stirred under an atmosphere of nitrogen while a total of 16.05 g. of butyl carbitol was added dropwise over a period of 0.5 hr. After the addition was complete the solvent was removed by distillation and the last traces were removed under reduced pressure. The resulting product was treated carefully with the stoichiometric quantity of water necessary to hydrolyze the intermediate to the desired O-(butoxyethoxyethyl)chlorophosphite which was formed as a liquid. The assigned structure was confirmed by nuclear magnetic resonance spectroscopy.

PREPARATION 4

O,O-di(butoxyethoxyethyl)phosphite

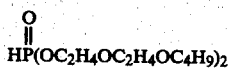

[also named as O,O-di(butoxyethoxyethyl) hydrogenphosphonate]

A mixture of 13.96 g. of phosphorus trichloride and 50 ml. of petroleum ether (b.p. 30°–75° C.) was stirred under an atmosphere of nitrogen while a total of 32.4 g. of butyl carbitol was added dropwise over a period of 0.5 hr. When the addition was complete, the resulting liquid product was established by nuclear magnetic resonance spectroscopy to be predominantly O,O-di(-butoxyethoxyethyl)phosphite.

EXAMPLE 1

A series of samples of wood particle board was prepared using a combination of polymethylene polyphenyl polyisocyanate and a compound of formula (I) above as the binder, the latter being used in the amount set forth in Table I below. The polyisocyanate used in all cases was a polymethylene polyphenyl polyisocyanate containing approximately 50 percent by weight of methylenebis(phenyl isocyanate) and having an isocyanate equivalent of 134 and a viscosity of about 140 cps. at 25° C. The method of preparation of the particle board sample in all instances was as follows:

A batch of 2500 g. of Douglas fir wood chips was sprayed with a blend of 112 g. of the polyisocyanate and an amount (see Table I) of the compound (I) sufficient to provide a level of phosphorus of 1 percent in the blend, said blend having been diluted with 50 g. of Freon R11 before being sprayed on the wood chips.

The spraying operation was accomplished by placing the wood chips in a rotating blender drum and rotating the drum while applying the blend of polyisocyanate and compound (I) to the tumbling chips with an internal mix spray tip. The chips were tumbled for a further 2 minutes after application of the spray. An aliquot (2156 g.) of the treated chips was utilized to prepare a particle board by forming the chips into a felted mat on an aluminum foil sheet supported on a cold-rolled steel plate (24"×36"). A plywood forming frame (18.5"×30") was used to prepare the felted mat. The frame was removed after the mat was prepared and ⅜" thick spacer bars were placed along the two longer opposing edges of the lower platen. A sheet of aluminum foil and a second steel plate (24"×36") were then placed on top of the mat. The complete assembly was placed on the lower platen of a press having a capacity of 100,000 lbs. of force. Both platens of the press were preheated to 350° F. Pressure was applied to bring the platens to the ⅜" spacers and was maintained for 2.5 minutes. At the end of this period the pressure was released and the caul plates, particle board, and aluminum foil were removed from the press. The relative ease with which the aluminum sheets separated from the finished particle board was then rated as "excellent" (no resistance to removal), "good" (no resistance to removal manually) or "fair" (some resistance but could be peeled off without tearing or other damage to the foil). The results are recorded in Table I. It will be seen that all the compounds (I) showed significant release properties.

TABLE I

| Compound (I) | % w/w P in binder[1] | % w/w of compound (I) in binder[1] | Ease of release |
|---|---|---|---|
| O—ethyl ethylphosphonate[2] | 0.96 | 4.3 | Fair |
| heptylphosphonic acid[2] | 1.0 | 6.2 | Excellent |
| phenylphosphonic acid[3] | 0.96 | 4.9 | Fair |
| phenylphosphinic acid[4] | 0.96 | 4.4 | Fair |
| diphenylphosphinic acid[5] | 0.43 | 5. | Fair |

Footnotes
[1]binder = polyisocyanate + compound (I)
[2]Preparation 2
[3]Aldrich Chemical Company
[4]Aldrich Chemical Company
[5]Aldrich Chemical Company

EXAMPLE 2

Two particle boards were prepared using the same procedure as that described in Example 1 with the sole exception that the polyisocyanate and the compound (I) [diluted with about 40 g. of Freon R11] were applied separately to the wood chips rather than being preblended and applied together. The results are recorded in Table II. It will be seen that the compounds (I) used in these two boards showed excellent release properties.

TABLE II

| Compound (I) | % w/w P in binder[1] | % w/w of compound (I) in binder[1] | Ease of release |
|---|---|---|---|
| O—octyl octylphosphonate[2] | 0.91 | 9.0 | Excellent |
| dodecylphosphonic acid[2] | 0.67 | 5 | Excellent |

Footnotes
[1]binder = polyisocyanate + compound (I)
[2]Preparation 2

EXAMPLE 3

Two particle-boards were prepared using the same procedure as that described in Example 2 but using as the release agent O-(butoxyethoxyethyl) chlorophosphite (Preparation 3) in the one case and O,O-di(butoxyethoxyethyl)phosphite (Preparation 4) in the other. Both agents were used in amounts corresponding to 5% w/w based on the total binder. The former compound gave release properties rated as good and the latter gave release properties rated as excellent.

I claim:

1. In a process for the preparation of particle board wherein particles of material capable of being compacted are contacted with a polyisocyanate composition and the treated particles are subsequently formed into boards by the application of heat and pressure, the improvement which comprises contacting said particles, in addition to the treatment with said polyisocyanate composition, with from about 0.1 to about 20 parts, per 100 parts by weight of said polyisocyanate, of a compound selected from the class consisting of:

(a) compounds having the formulae:

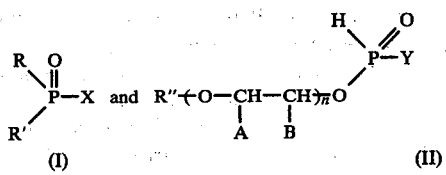

wherein R is hydrocarbyl; R' is selected from the group consisting of hydrocarbyl, alkoxy, hydroxyl and

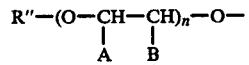

wherein R" is selected from the group consisting of alkyl and aryl, one of A and B represents hydrogen and the other is selected from the class consisting of hydrogen, methyl, chloromethyl and 2,2,2-trichloroethyl, and n is a number having an average value from 1 to 25;

R and R' taken together represent alkylene having 3 to 5 carbon atoms in the chain separating the valencies;

X is selected from the group consisting of hydroxy, halo, acyloxy, hydrocarbylamino, and

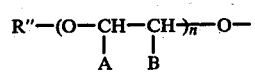

wherein R", A, B, and n are as defined above; and Y represents a member selected from the group consisting of halo and

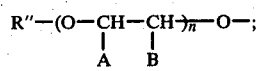

(b) metal, ammonium and organic amine salts of the acids of formula (I) wherein R' and or X represents hydroxyl.

2. The process of claim 1 wherein said polyisocyanate is a polymethylene polyphenyl polyisocyanate containing from about 25 to about 90 percent by weight of methylenebis(phenyl isocyanate), the remainder of said mixture being oligomeric polymethylene polyphenyl polyisocyanates of functionality greater than 2.

3. The process of claim 2 wherein the polymethylene polyphenyl polyisocyanate contains from about 35 to about 65 percent by weight of methylenebis(phenyl isocyanate).

4. The process of claim 1 wherein said compound (I) comprises O-ethyl ethylphosphonic acid.

5. The process of claim 1 wherein said compound (I) comprises heptylphosphonic acid.

6. The process of claim 1 wherein said compound (I) comprises O-octyl octylphosphonic acid.

7. The process of claim 1 wherein said compound (I) comprises dodecylphosphonic acid.

8. The process of claim 1 wherein said compound (I) comprises phenylphosphonic acid.

9. The process of claim 1 wherein said compound (I) comprises phenylphosphinic acid.

10. The process of claim 1 wherein said compound (I) comprises diphenylphosphinic acid.

11. The process of claim 1 wherein said compound (II) is O-butoxyethoxyethyl chlorophosphite.

12. The process of claim 1 wherein said compound (II) is O,O-di(butoxyethoxyethyl)phosphite.

13. The process of claim 1 wherein the particles employed in the preparation of said particle board are wood chips.

14. The process of claim 1 wherein said polyisocyanate and said compound (I) or salt thereof or said compound (II) are applied simultaneously to said particles in the form of an aqueous emulsion.

15. The process of claim 14 wherein said aqueous emulsion of polyisocyanate also comprises an emulsifying agent.

16. The process of claim 1 wherein said particles are contacted separately with said polyisocyanate and said compound (I), a salt thereof, or said compound (II).

17. The process of claim 16 wherein said polyisocyanate and said compound (I), a salt thereof, or said compound (II) are each employed in the form of an aqueous emulsion.

* * * * *

UNITED STATES PATENT OFFICE
CERTIFICATE OF CORRECTION

Patent No. 4,352,696           Dated October 5, 1982

Inventor(s) Richard A. Prather

It is certified that error appears in the above-identified patent and that said Letters Patent are hereby corrected as shown below:

Column 1, line 49 "4,256,995" should read --4,257,995--.
Column 3, line 25 "1-hyroxy-" should read --1-hydroxy- --.
Column 7, line 58 "1-bentenyl-," should read --1-butenyl-,--.

Signed and Sealed this

Eighteenth Day of January 1983

[SEAL]

Attest:

GERALD J. MOSSINGHOFF

*Attesting Officer*      *Commissioner of Patents and Trademarks*